Patented Mar. 29, 1932

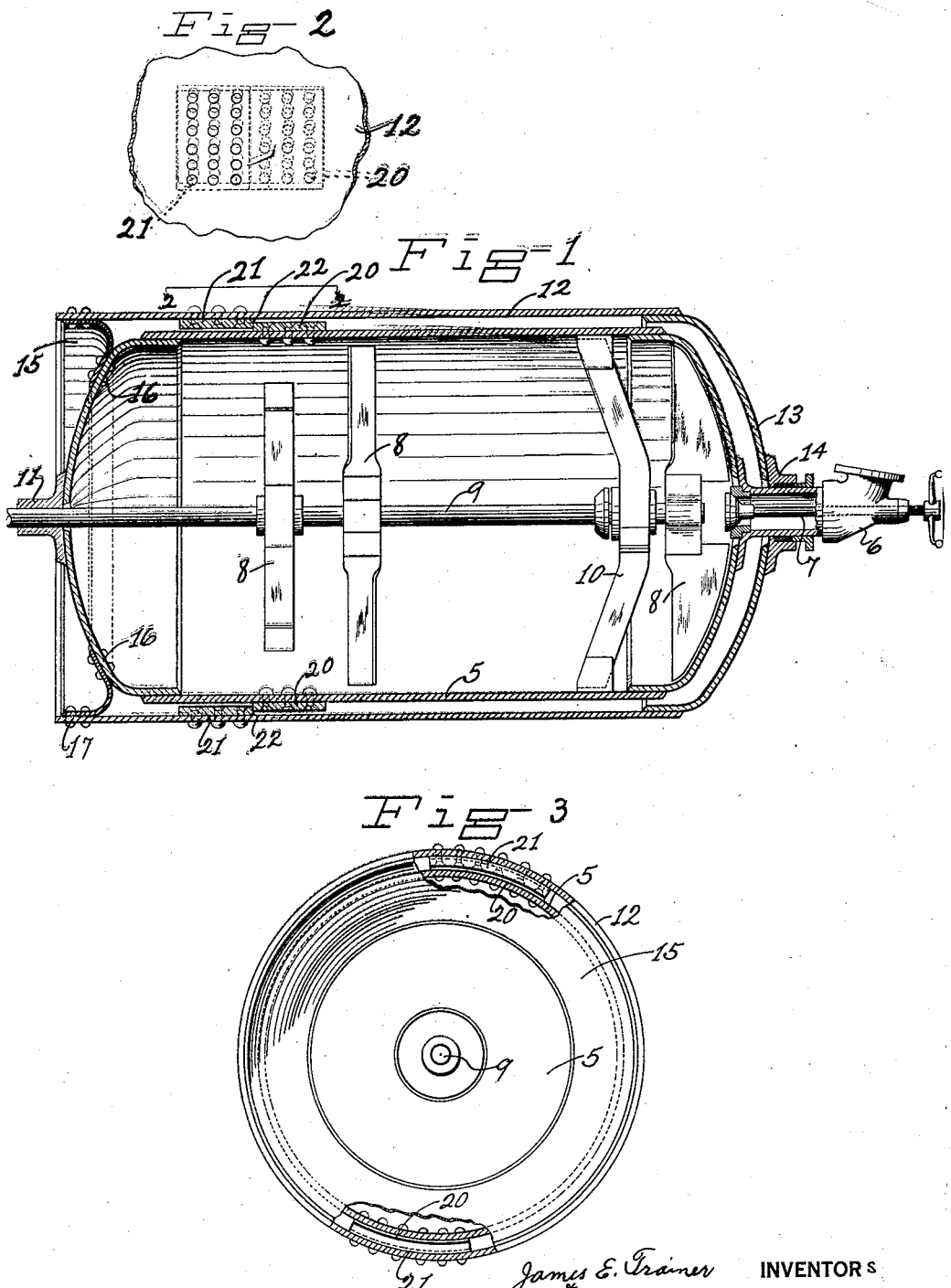

1,851,024

UNITED STATES PATENT OFFICE

JAMES E. TRAINER, OF BARBERTON, OHIO, AND WILLIAM A. JONES, OF WEST NEW BRIGHTON, NEW YORK, ASSIGNORS TO THE BABCOCK & WILCOX COMPANY, OF BAYONNE, NEW JERSEY, A CORPORATION OF NEW JERSEY

DEVICE FOR TREATING MATERIALS CHEMICALLY

Application filed April 5, 1927, Serial No. 181,051. Renewed July 29, 1930.

This invention relates to a device in which materials can be treated for the purpose of altering their characteristics, or otherwise changing the materials, and is especially applicable to devulcanizers for rubber. The invention will be understood from the description in connection with the accompanying drawings, in which Fig. 1 is a longitudinal section through the device; Fig. 2 is a side view partly broken away along the line 2—2 of Fig. 1 and Fig. 3 is an end view of the device partly in section. In the drawings reference character 5 indicates an inner vessel that is preferably made in the form of a cylinder with both ends closed. The device will preferably be installed with its central axis vertical, so that the discharge pipe 6 and the discharge valve 7 will be at the bottom. The vessel 5 is provided with a stirrer having blades or paddles 8 attached to the central shaft 9 that is driven in any convenient manner and is supported upon bearings, one of which, as shown at 10, is located inside of the vessel 5 near one end thereof, while the other bearing 11 is located outside the vessel 5 at the other end thereof and may be provided with a stuffing box if desired to prevent leakage between the shaft 9 and the bearing 11. A jacket 12 surrounds the cylindrical surface of the vessel 5 and one end thereof as shown at 13. A stuffing box 14 is provided around the hole through the portion 13 through which the discharge pipe 6 passes. The inner vessel 5 is provided in the usual way with the inlets and outlets with proper valve connections by which material to be treated, such as used rubber for example, is introduced into the vessel 5 and discharged therefrom after it has been treated, and also for introducing chemicals and washing fluids into the vessel 5 and discharging the same therefrom at the proper time, and likewise inlet and outlet pipes with suitable valve connections are provided for the jacket 12 by means of which heating fluids and cooling fluids can be introduced into the space between the vessel and the jacket at the proper time. These pipe connections and valves are old and well known in this art, and it is not thought necessary to illustrate or describe the same as they constitute no part of the present invention.

In devices of this character, the end of the jacket opposite the end that extends around the inner vessel has been connected to the vessel either by welding or riveting the end of the jacket to the outside walls of the inner vessel, or by rigidly connecting the two in some other manner. Due to the fact that the vessel and jacket are frequently subjected to different temperatures, causing expansion and contraction, leaks are often caused by strains that are set up.

By the present invention a gas tight connection is made between the jacket and the inner vessel, and at the same time a relative movement between the vessel and jacket is permitted without danger of causing leaks. Also provision is made for relieving excessive strains on the connections between the vessel and jacket, while permitting relative movement between the two. An annular, flexible sheet metal strip 15, U-shaped in cross section, has one of its sides or flanges riveted to the outside of the vessel 5, as shown at 16, and its other side of flange riveted to the inside of the jacket 12 near the end thereof, as shown at 17, to provide a gas tight seal for the space between the vessel and jacket which will permit relative motion between the two, due to expansion and contraction.

Lugs or projections 20 are provided on the outside of the vessel 5 and lugs or projections 21 are provided on the inside of the jacket 12. These lugs or projections are shown in the illustrated embodiment of the invention as plates that are riveted to the vessel and jacket respectively. The plates 20 extend only partially around the vessel 5, leaving sufficient spaces between them for the plates 21 to pass, and the plates 21 on the jacket 12 are similarly disposed so that in installing the device, the vessel 5 can be moved into place longitudinally within the jacket 12, the plates 20 passing between the plates 21, after which the vessel 5 can be turned circumferentially until the lugs 20 are in line behind the lugs 21 with their edges contacting, as shown at 22. The metal sheet 15 is then riveted in place.

It will be seen that the unbalanced thrust due to fluids under pressure in the space opposite the end 13 will not be required to be taken up by the plate 15, but will be balanced by the pressure of the lugs or plates 20 on the vessel 5 bearing against the lugs or plates 21 on the jacket 12. At the same time the springiness or flexibility of the plate 15 will permit the vessel 5 and the jacket 12 to move relatively to each other, either longitudinally as the discharge pipe 6 moves through the stuffing box 14, or radially as the sheet 15 will bend to accommodate these motions.

We claim:

1. In a device for treating materials, a vessel, a jacket for said vessel spaced therefrom, a flexible closure extending across the space between said vessel and jacket and attached to each, and lugs on said vessel and jacket to stop the relative movement of said vessel with respect to said jacket at a predetermined relative position of the jacket and vessel.

2. In a device for treating materials, a vessel, a jacket for said vessel spaced therefrom, a flexible closure extending across the space between said vessel and jacket and attached to each, lugs attached to said vessel and lugs attached to said jacket located between said first named lugs and said flexible closure.

3. In a device for treating materials, a vessel, a jacket for said vessel spaced therefrom, a flexible closure extending across the space between said vessel and jacket and attached to each, lugs attached to said vessel and lugs attached to said jacket located between said first named lugs and said flexible closure, the lugs on said vessel being spaced from each other at least as far as the circumferential dimension of the other lugs.

4. In a device of the class described, a vessel having closed ends, a jacket surrounding said vessel and spaced therefrom at one of said ends and disconnected therefrom at said end and between said ends, a flexible connection between the other of said ends and the jacket and permitting lengthwise movement of the vessel in the jacket, and cooperating elements on the vessel and jacket limiting said movement.

5. In a device of the class described, a vessel having closed ends, a jacket surrounding said vessel and spaced therefrom at one of said ends and disconnected therefrom at said end and between said ends, a flexible connection between the other of said ends and the jacket and permitting lengthwise movement of the vessel in the jacket, cooperating elements on the vessel and jacket limiting said movement, a pipe passing through said jacket and connected to the first-named end, and a stuffing box surrounding said pipe to permit lengthwise movement thereof with said vessel.

6. In a device of the class described, a vessel having closed ends, a jacket surrounding said vessel and spaced therefrom at one of said ends and disconnected therefrom at said end and between said ends, a flexible connection between the other of said ends and the jacket and permitting lengthwise movement of the vessel in the jacket, and cooperating elements on the vessel and jacket limiting said movement in a direction away from said first-named end.

JAMES E. TRAINER.
WILLIAM A. JONES.